United States Patent
Zhang et al.

(10) Patent No.: US 12,321,265 B2
(45) Date of Patent: Jun. 3, 2025

(54) MEMORY CONTROLLER PERFORMING GARBAGE COLLECTION, MEMORY SYSTEM, METHOD, AND STORAGE MEDIUM THEREOF

(71) Applicant: YANGTZE MEMORY TECHNOLOGIES CO., LTD., Wuhan (CN)

(72) Inventors: Ruiyang Zhang, Wuhan (CN); Qi Hu, Wuhan (CN); Youxin He, Wuhan (CN)

( * ) Notice: Subject to any disclaimer, the term of this patent is extended or adjusted under 35 U.S.C. 154(b) by 0 days.

(21) Appl. No.: 18/537,193

(22) Filed: Dec. 12, 2023

(65) Prior Publication Data

US 2025/0147880 A1    May 8, 2025

Related U.S. Application Data

(63) Continuation of application No. PCT/CN2023/129599, filed on Nov. 3, 2023.

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ...... G06F 12/0253; G06F 2212/7205
See application file for complete search history.

(56) References Cited

U.S. PATENT DOCUMENTS

| | | | |
|---|---|---|---|
| 11,016,882 B2 | 5/2021 | Gorobets et al. | |
| 11,429,307 B2* | 8/2022 | Choi | G06F 12/0253 |
| 11,507,272 B2* | 11/2022 | Jang | G06F 12/0246 |
| 2007/0136402 A1* | 6/2007 | Grose | G06F 12/0253 |
| 2011/0022778 A1 | 1/2011 | Schibilla et al. | |
| 2015/0026390 A1* | 1/2015 | Li | G06F 12/0246 711/103 |
| 2017/0255550 A1 | 9/2017 | Kim et al. | |
| 2017/0308449 A1* | 10/2017 | Mangione-Tran | G06F 11/0778 |
| 2019/0171564 A1* | 6/2019 | Bahirat | G06F 3/0679 |
| 2022/0413738 A1* | 12/2022 | Choi | G06F 12/0253 |
| 2024/0160562 A1* | 5/2024 | Deora | G06F 12/0253 |
| 2024/0160563 A1* | 5/2024 | Kochar | G06F 12/0253 |

FOREIGN PATENT DOCUMENTS

CN    116610597 A    8/2023

OTHER PUBLICATIONS

International Search Report issued in corresponding International Application No. PCT/CN2023/129599, mailed on Apr. 3, 2024, 4 pages.

* cited by examiner

*Primary Examiner* — Jared M Bibbee
(74) *Attorney, Agent, or Firm* — BAYES PLLC

(57) ABSTRACT

In certain aspects, a method for operating a memory controller is disclosed. The method includes determining a total used amount of a user data storage space of a memory device. The method also includes determining whether a garbage collection (GC) triggering condition is satisfied based on the total used amount of the user data storage space. The method further includes determining whether to perform a GC process on the memory device based on whether the GC triggering condition is satisfied.

20 Claims, 10 Drawing Sheets

MEMORY CONTROLLER PERFORMING GARBAGE COLLECTION, MEMORY SYSTEM, METHOD, AND STORAGE MEDIUM THEREOF

CROSS-REFERENCE TO RELATED APPLICATIONS

This application is a continuation of International Application No. PCT/CN2023/129599, filed on Nov. 3, 2023, entitled "MEMORY CONTROLLER PERFORMING GARBAGE COLLECTION, MEMORY SYSTEM, METHOD, AND STORAGE MEDIUM THEREOF," which is incorporated herein by reference in its entirety.

BACKGROUND

The present disclosure relates to memory controllers, memory systems, and operation methods thereof.

Non-volatile storage devices such as solid-state drives (SSDs), non-volatile memory express (NVMe), embedded multimedia cards (eMMCs), and universal flash storage (UFS) devices, etc., have gained significant popularity in recent years due to their numerous advantages over traditional hard disk drives (HDDs), such as faster read and write speed, durability and reliability, reduced power consumption, silent operation, and smaller form factors. For example, non-volatile storage devices such as SSDs may use NAND Flash memory for non-volatile storage. Various operations can be performed by NAND Flash memory, such as read, program (write), and erase. For NAND Flash memory, an erase operation can be performed at the block level, and a program operation or a read operation can be performed at the page level.

SUMMARY

In one aspect, a method for operating a memory controller is disclosed. The method includes determining a total used amount of a user data storage space of a memory device. The method also includes determining whether a garbage collection (GC) triggering condition is satisfied based on the total used amount of the user data storage space. The method further includes determining whether to perform a GC process on the memory device based on whether the GC triggering condition is satisfied.

In some implementations, the total used amount of the user data storage space includes a total number of used data blocks in the user data storage space.

In some implementations, determining whether the GC triggering condition is satisfied includes determining a total number of expected-used data blocks in the user data storage space, and determining whether the GC triggering condition is satisfied based on the total number of the used data blocks and the total number of the expected-used data blocks.

In some implementations, the total number of the used data blocks includes a total number of virtual blocks in the user data storage space that are already used. The total number of the expected-used data blocks includes a total number of virtual blocks in the user data storage space that are expected to be used.

In some implementations, determining whether the GC triggering condition is satisfied includes determining whether the total number of the used data blocks is greater than the total number of the expected-used data blocks.

In some implementations, responsive to the total number of the used data blocks being greater than the total number of the expected-used data blocks, it is determined that the GC triggering condition is satisfied. Or, responsive to the total number of the used data blocks being smaller than or equal to the total number of the expected-used data blocks, it is determined that the GC triggering condition is not satisfied.

In some implementations, determining whether the GC triggering condition is satisfied further includes determining valid page counts (VPCs) associated with the used data blocks in the user data storage space, respectively, and determining whether a minimum VPC from the VPCs is not greater than a VPC threshold.

In some implementations, responsive to the total number of the used data blocks being greater than the total number of the expected-used data blocks and the minimum VPC being not greater than the VPC threshold, it is determined that the GC triggering condition is satisfied. Or, responsive to the total number of the used data blocks being not greater than the total number of the expected-used data blocks or the minimum VPC being greater than the VPC threshold, it is determined that the GC triggering condition is not satisfied.

In some implementations, determining the total number of the expected-used data blocks includes determining a degree of logical saturation for the memory device to be a ratio between a total size of valid data in the user data storage space and a size of the user data storage space, and determining the total number of the expected-used data blocks based on the degree of logical saturation.

In some implementations, the total size of the valid data in the user data storage space includes a total number of valid pages in the user data storage space.

In some implementations, determining the total number of the expected-used data blocks based on the degree of logical saturation includes responsive to the degree of logical saturation being not greater than a first saturation threshold, determining the total number of the expected-used data blocks to be a predetermined fixed value.

In some implementations, determining the total number of the expected-used data blocks based on the degree of logical saturation further includes responsive to the degree of logical saturation being not smaller than a second saturation threshold, determining the total number of the expected-used data blocks to be a first saturation variable having a linear relationship with the degree of logical saturation.

In some implementations, determining the total number of the expected-used data blocks based on the degree of logical saturation further includes responsive to the degree of logical saturation being greater than the first saturation threshold and being smaller than the second saturation threshold, determining a first value of the first saturation variable when the degree of logical saturation is equal to the second saturation threshold, determining a second saturation variable having a nonlinear relationship with the degree of logical saturation, and determining the total number of the expected-used data blocks to be a minimum of the first value of the first saturation variable and the second saturation variable.

In some implementations, the GC process is a background GC process. Determining whether to perform the GC process on the memory device includes responsive to the GC triggering condition being satisfied, performing the GC process on the memory device by determining VPCs associated with the used data blocks in the user data storage space, respectively; selecting, from the used data blocks, a first data block having a minimum VPC among the VPCs; generating and sending a read command to instruct the memory device to read out data stored in a set of valid pages from the first data block; receiving the data stored in the set of valid pages from the first data block of the memory device; and generating and sending a program command to instruct the memory device to program the data stored in the set of valid pages to a second data block in the user data storage space.

In some implementations, an erase command is generated and sent to instruct the memory device to erase data stored in the first data block. The total number of the used data blocks is updated.

In some implementations, it is determined whether a GC termination condition is satisfied. Responsive to the GC termination condition being satisfied, the GC process is terminated.

In some implementations, determining whether the GC termination condition is satisfied includes determining whether the total number of the used data blocks is smaller than or equal to the total number of the expected-used data blocks, and responsive to the total number of the used data blocks being smaller than or equal to the total number of the expected-used data blocks, determining that the GC termination condition is satisfied.

In some implementations, determining whether the GC termination condition is satisfied includes determining VPCs associated with the used data blocks in the user data storage space, respectively, determining whether a minimum VPC from the VPCs is greater than a VPC threshold, and responsive to the minimum VPC being greater than the VPC threshold, determining that the GC termination condition is satisfied.

In some implementations, the total number of the used data blocks is retrieved from the memory controller.

In some implementations, the memory device includes NAND Flash memory.

In another aspect, a memory controller includes a memory configured to store instructions and a processor coupled to the memory and configured to execute the instructions to perform a process. The process includes determining a total used amount of a user data storage space of a memory device. The process also includes determining whether a GC triggering condition is satisfied based on the total used amount of the user data storage space. The process further includes determining whether to perform a GC process on the memory device based on whether the GC triggering condition is satisfied.

In some implementations, the total used amount of the user data storage space includes a total number of used data blocks in the user data storage space. Determining whether the GC triggering condition is satisfied includes determining a total number of expected-used data blocks in the user data storage space, and determining whether the GC triggering condition is satisfied based on the total number of the used data blocks and the total number of the expected-used data blocks.

In some implementations, determining whether the GC triggering condition is satisfied includes determining whether the total number of the used data blocks is greater than the total number of the expected-used data blocks.

In some implementations, determining whether the GC triggering condition is satisfied further includes determining VPCs associated with the used data blocks in the user data storage space, respectively, and determining whether a minimum VPC from the VPCs is not greater than a VPC threshold.

In some implementations, the process further includes responsive to the total number of the used data blocks being greater than the total number of the expected-used data blocks and the minimum VPC being not greater than the VPC threshold, determining that the GC triggering condition is satisfied; or, responsive to the total number of the used data blocks being not greater than the total number of the expected-used data blocks or the minimum VPC being greater than the VPC threshold, determining that the GC triggering condition is not satisfied.

In some implementations, determining the total number of the expected-used data blocks includes determining a degree of logical saturation for the memory device to be a ratio between a total size of valid data in the user data storage space and a size of the user data storage space, and determining the total number of the expected-used data blocks based on the degree of logical saturation.

In still another aspect, a memory system includes a memory device and a memory controller operatively coupled to the memory device. The memory controller is configured to determine a total used amount of a user data storage space of the memory device. The memory controller is further configured to determine whether a GC triggering condition is satisfied based on the total used amount of the user data storage space. The memory controller is further configured to determine whether to perform a GC process on the memory device based on whether the GC triggering condition is satisfied.

In some implementations, the total used amount of the user data storage space includes a total number of used data blocks in the user data storage space. To determine whether the GC triggering condition is satisfied, the memory controller is configured to determine a total number of expected-used data blocks in the user data storage space, and determine whether the GC triggering condition is satisfied based on the total number of the used data blocks and the total number of the expected-used data blocks.

In some implementations, to determine whether the GC triggering condition is satisfied, the memory controller is configured to determine whether the total number of the used data blocks is greater than the total number of the expected-used data blocks.

In some implementations, to determine whether the GC triggering condition is satisfied, the memory controller is further configured to determine VPCs associated with the used data blocks in the user data storage space, respectively, and determine whether a minimum VPC from the VPCs is not greater than a VPC threshold.

In some implementations, to determine the total number of the expected-used data blocks, the memory controller is configured to determine a degree of logical saturation for the memory device to be a ratio between a total size of valid data in the user data storage space and a size of the user data storage space, and determine the total number of the expected-used data blocks based on the degree of logical saturation.

In yet another aspect, a non-transitory computer-readable storage medium is disclosed which includes instructions that, when executed by a processing device, cause the processing device to perform a method. The method includes determining a total used amount of a user data storage space of a memory device. The method also includes determining whether a GC triggering condition is satisfied based on the total used amount of the user data storage space. The method also includes determining whether to perform a GC process on the memory device based on whether the GC triggering condition is satisfied.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1:
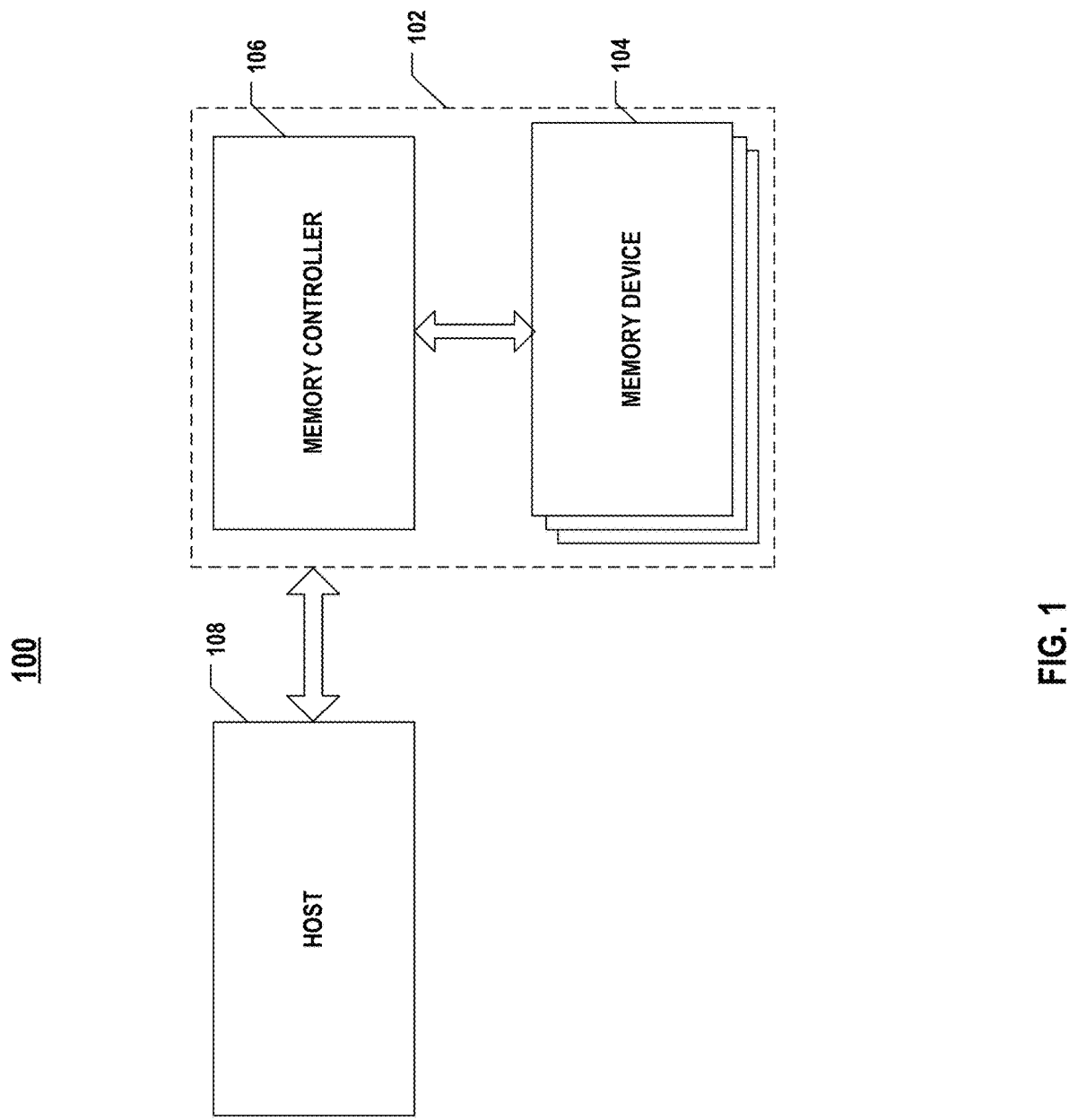
FIG. 1 illustrates a block diagram of a system including a memory system, according to some aspects of the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Garbage collection (GC) is a process used by non-volatile memory devices to optimize storage space, improve read and write efficiency, and keep the non-volatile memory devices working as efficiently as possible. Non-volatile memory devices may read and write data in pages, and erase data in blocks with each block having hundreds of pages. While non-volatile memory devices can write new data quickly, they take much longer to overwrite data. To erase a block, a non-volatile memory device needs to copy valid data of the block to another block, and subsequently erase all the data in the block. GC can help non-volatile memory devices to maintain fast read and write speeds. An example goal of GC is to keep as many empty blocks as possible, so that when the non-volatile memory devices need to write data, they can do so without waiting for the blocks to be erased.

Non-volatile memory devices such as SSDs typically may use NAND Flash memory for non-volatile storage. A NAND Flash memory device may include a plurality of dies with each die having a plurality of planes. Each plane can be divided into a plurality of physical blocks (e.g., a physical block can be a basic data unit for the erase operation). A virtual block (VB) may include one or more physical blocks. For example, the NAND Flash memory device may have 4 dies with each die having 6 planes, so that the NAND Flash memory device may have 4×6=24 planes in total. A virtual block may include one physical block from each plane such that the virtual block may include 24 physical blocks from the 24 planes, respectively. Data stored in the physical blocks within the same virtual block can be read out in parallel. Similarly, new data can also be written into the physical blocks within the same virtual block in parallel.

The number of available virtual blocks released through GC may directly affect the write performance of the NAND Flash memory device. In particular, after the NAND Flash memory device has been used for a long time, the available storage space is reduced, and the write performance can be attenuated due to the lack of available virtual blocks. In practice, the occupied virtual blocks can be released through background garbage collection (BGC) with various BGC strategies applied. However, GC (e.g., BGC) may cause various adverse effects. For example, because the NAND Flash memory device writes data in pages but erases data in blocks, the amount of data being written to the NAND Flash memory device during GC is larger than the actual update, which is referred to as write amplification. When the amount of data to be written to the NAND Flash memory device is large, the write speed can be slow. Thus, it can be difficult to form and apply a new GC strategy to the NAND Flash memory device because various factors need to be considered.

To address one or more of the aforementioned issues, the present disclosure introduces a GC scheme with application of a degree of logical saturation, which can enhance the write performance greatly. For example, with the application of the GC scheme disclosed herein, although the write amplification can be increased slightly, the write speed can be improved significantly, especially when the memory device is a dirty disk with high capacity usage and severe file fragmentation. Further, the GC scheme disclosed herein can meet users' needs for aging testing. For example, when the degree of logical saturation is greater than 95%, the performance drop of the memory device is less than 20%. In addition to taking VPCs of used data blocks into consideration, the GC scheme disclosed herein also considers the degree of logical saturation of the memory device. Thus, the GC scheme disclosed herein can flexibly arrange a GC strategy based on the total used amount of the user data storage space of the memory device.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SSD.

Memory devices 104 can be any memory devices disclosed in the present disclosure, including non-volatile memory devices, such as NAND Flash memory devices. In some implementations, memory device 104 also includes one or more volatile memory devices, such as DRAM devices or static random-access memory (SRAM) devices.

Memory controller 106 is operatively coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, logical-to-physical (L2P) address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
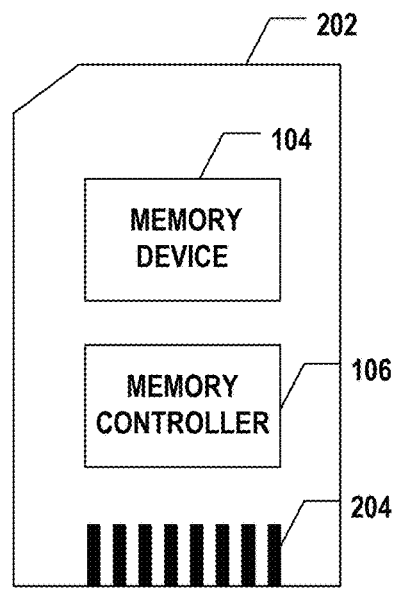
FIG. 2A illustrates a diagram of a memory card having a memory device, according to some aspects of the present disclosure.
Figure 2B:
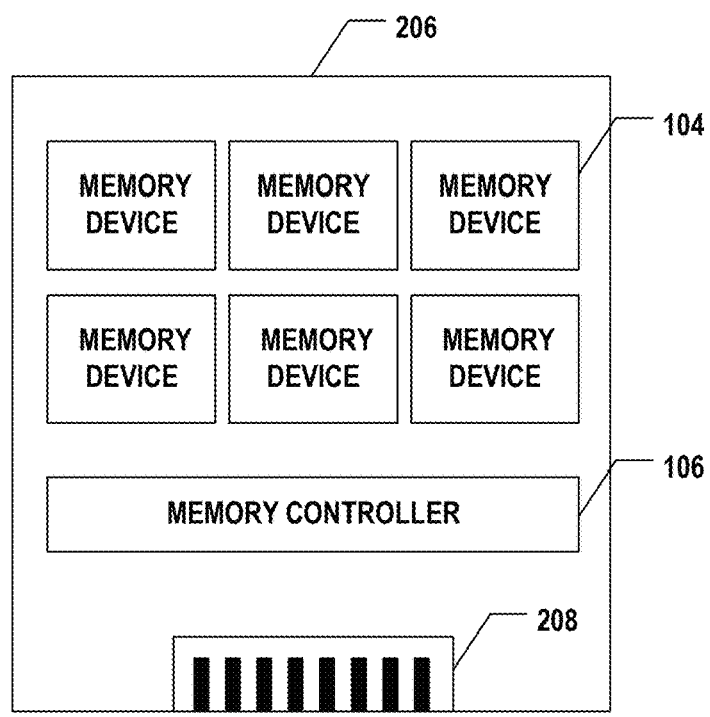
FIG. 2B illustrates a diagram of an SSD having memory devices, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Figure 3A:
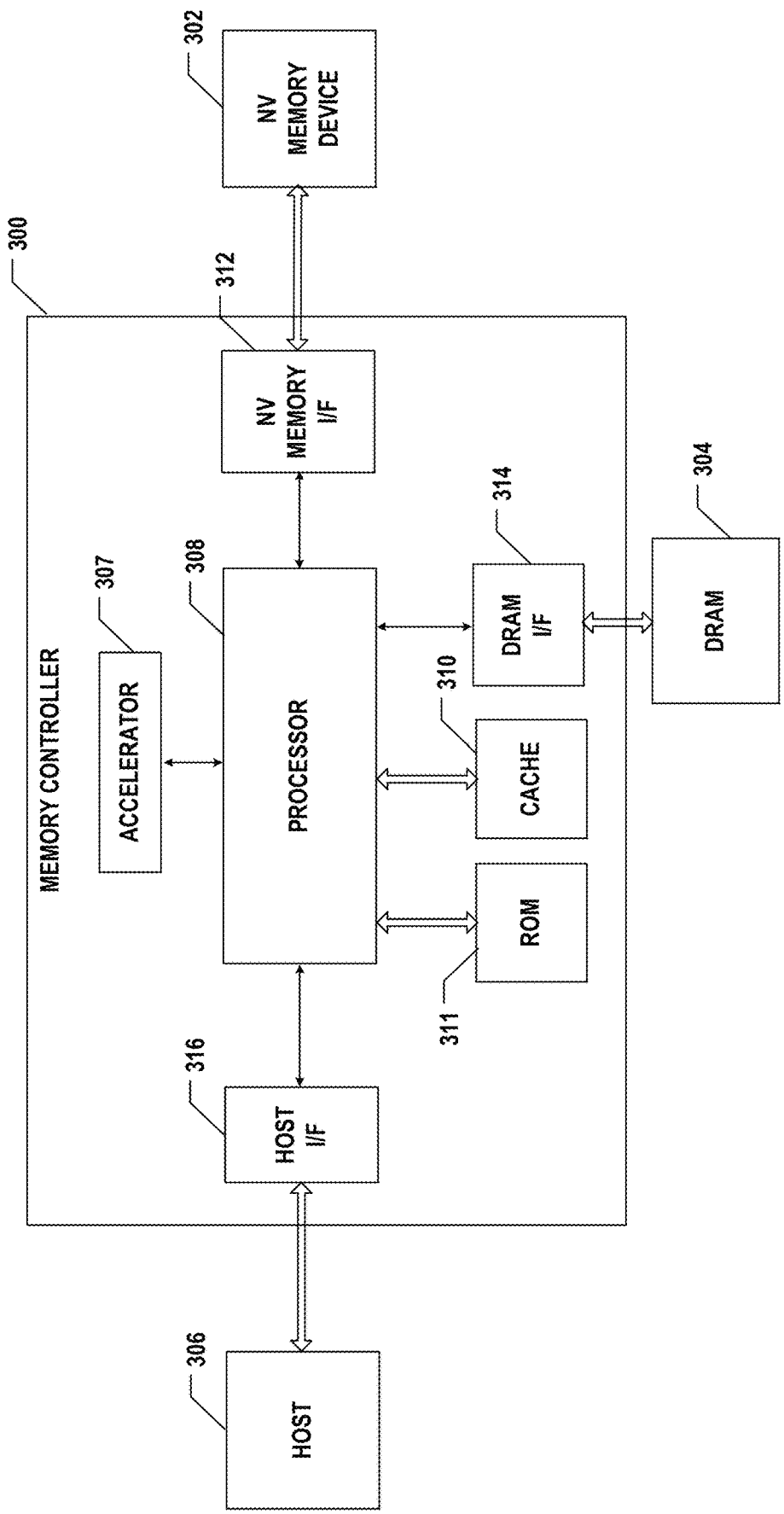
FIG. 3A illustrates a block diagram of a memory controller, according to some aspects of the present disclosure.

FIG. 3A illustrates a block diagram of a memory controller 300, according to some aspects of the present disclosure. Memory controller 300 may be one example of memory controller 106 in FIG. 1. As shown in FIG. 3A, memory controller 300 can include a processor 308, an accelerator 307 (e.g., a hardware accelerator), a cache 310, and a read-only memory (ROM) 311. In some implementations, processor 308 is implemented by microprocessors (e.g., digital signal processors (DSPs)) or microcontrollers (a.k.a. microcontroller units (MCUs)) that execute firmware and/or software modules to perform the various functions described herein. The various firmware modules in memory controller 300 described herein can be implemented as firmware codes or instructions stored in ROM 311 and executed by processor 308. In some implementations, processor 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3A, memory controller 300 can also include various input/output (I/O) interfaces (I/F), such as a non-volatile memory interface 312, a DRAM interface 314, and a host interface 316 operatively coupled to a non-volatile memory device 302 (e.g., flash memory), DRAM 304 (e.g., an example of volatile memory devices), and a host 306 (e.g., an example of host 108), respectively. Non-volatile memory interface 312, DRAM interface 314, and host interface 316 can be configured to transfer data, command, clock, or any suitable signals between processor 308 and non-volatile memory device 302, DRAM 304, and host 306, respectively. Non-volatile memory interface 312, DRAM interface 314, and host interface 316 can implement any suitable communication protocols facilitating data transfer, communication, and management, such as the NVMe protocol and PCI-E protocol, double data rate (DDR) protocol, to name a few.

As described above, both cache 310 and DRAM 304 may be considered volatile memory devices that can be controlled and accessed by memory controller 300 in a memory system. Consistent with the scope of the present disclosure, a cache can be implemented as part of volatile memory devices, for example, by an SRAM and/or DRAM 304. It is understood that although FIG. 3A shows that cache 310 is within memory controller 300 and DRAM 304 is outside of memory controller 300. In some examples, both cache 310 and DRAM 304 may be within memory controller 300 or outside of memory controller 300.

Consistent with the scope of the present disclosure and disclosed below in detail, memory controller 300 can be configured to determine a total used amount of a user data storage space of non-volatile memory device 302. Memory controller 300 may determine whether a GC triggering condition is satisfied based on the total used amount of the user data storage space. Memory controller 300 may further determine whether to perform a GC process on non-volatile memory device 302 based on whether the GC triggering condition is satisfied. Memory controller 300 is described below in more detail with reference to FIGS. 5-7C.

Figure 3B:
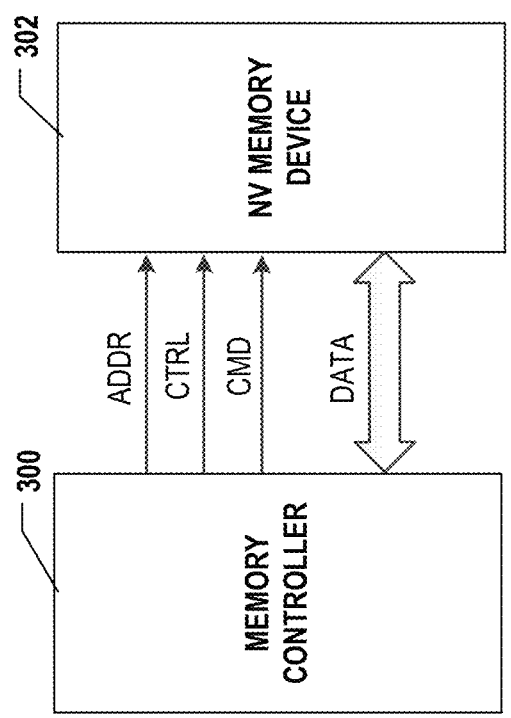
FIG. 3B illustrates example interactions between a memory controller and a non-volatile (NV) memory device, according to some aspects of the present disclosure.

FIG. 3B illustrates example interactions between memory controller 300 and non-volatile memory device 302 of FIG. 3A, according to some aspects of the present disclosure. In some implementations, memory controller 300 may send at least one of address (ADDR) signals, control (CTRL) signals, or command (CMD) signals to non-volatile memory device 302. In some implementations, memory controller 300 may receive data to be stored in non-volatile memory device 302 from a host (e.g., host 108). Memory controller 300 may send a program command as well as the received data to non-volatile memory device 302 for storage. Alternatively or additionally, memory controller 300 may send a read command to non-volatile memory device 302 and retrieve data corresponding to the read command from non-volatile memory device 302. Further example interaction between memory controller 300 and non-volatile memory device 302 is illustrated below with reference to FIGS. 6A-6B.

Figure 4:
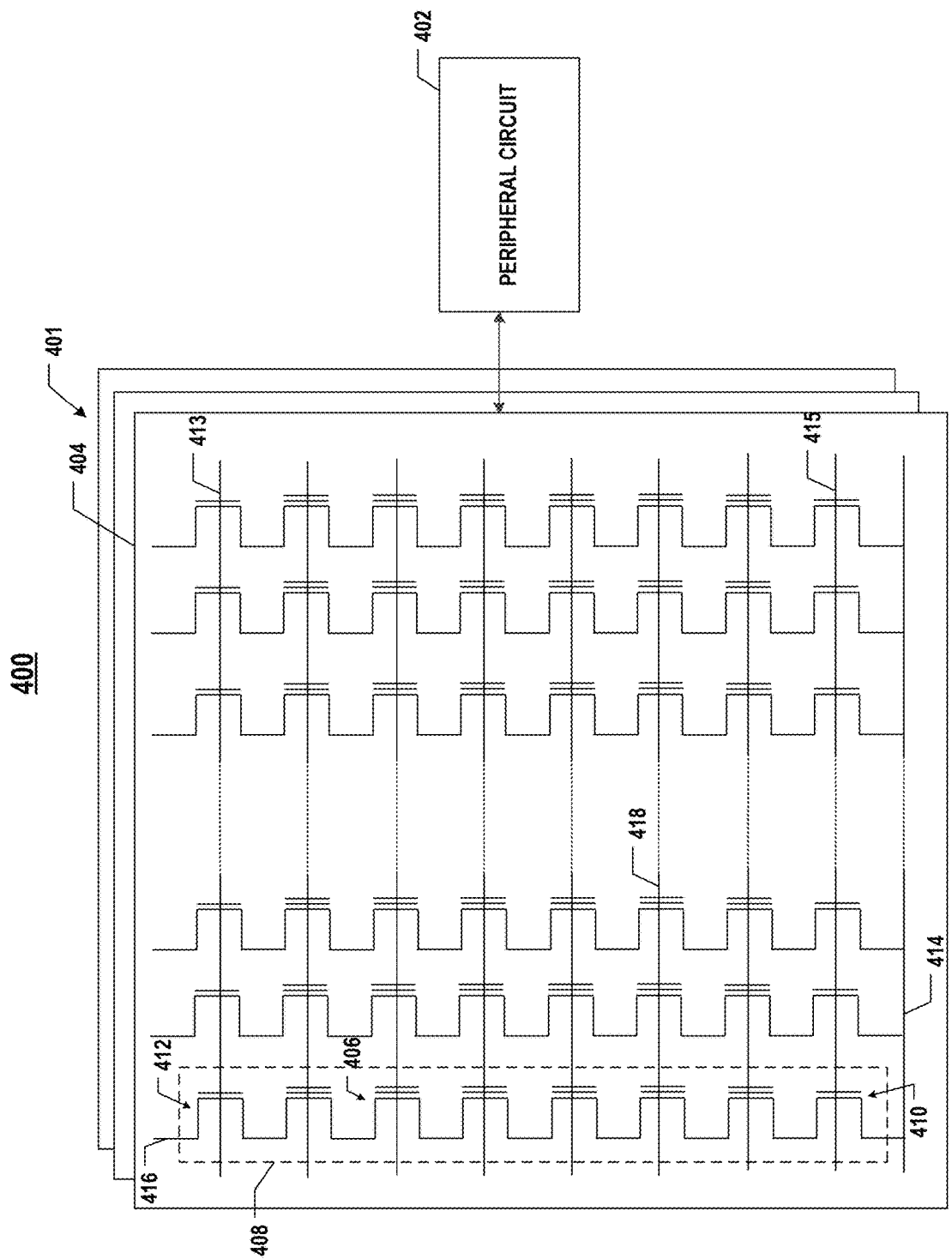
FIG. 4 illustrates a schematic diagram of a NAND Flash memory device including peripheral circuits, according to some aspects of the present disclosure.

FIG. 4 illustrates a schematic circuit diagram of a NAND Flash memory device 400 including peripheral circuits 402, according to some aspects of the present disclosure. NAND Flash memory device 400 may be one example of non-volatile memory device 302 in FIG. 3A. NAND Flash memory device 400 can include a memory cell array 401 and peripheral circuits 402 operatively coupled to memory cell array 401. Memory cells 406 in memory cell array 401 are provided in the form of an array of memory strings 408 each extending vertically above a substrate (not shown). In some implementations, each memory string 408 includes a plurality of memory cells 406 operatively coupled in series and stacked vertically. Each memory cell 406 can hold a continuous, analog value, such as an electrical voltage or charge, which depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible levels (memory states) and thus, can store one bit of data. For example, the first state "0" can correspond to a first range of threshold voltages, and the second state "1" can correspond to a second range of threshold voltages. In some implementations, each memory cell 406 is an xLC that is capable of storing more than a single bit of data in more than four levels. For example, the xLC may store two bits per cell (a.k.a., multi-level cell (MLC)), three bits per cell (a.k.a., triple-level cell (TLC)), or four bits per cell (a.k.a. quad-level cell (QLC)). Each xLC can be programmed to assume a range of possible nominal storage values (i.e., corresponding to $2^N$ pieces of N-bits data). In some implementations, each memory cell 406 is set to one of $2^N$ levels corresponding to a piece of N-bits data, where N is an integer greater than 1. N may denote the total number of bits per cell. For example, N=2 for MLC, N=3 for TLC, or N=4 for QLC.

As shown in FIG. 4, each memory string 408 can also include a source select gate (SSG) transistor 410 at its source end and a drain select gate (DSG) transistor 412 at its drain end. SSG transistor 410 and DSG transistor 412 can be configured to activate select memory strings 408 (columns of the array) during read and program operations. In some implementations, the sources of memory strings 408 in the same block 404 are coupled through a same source line (SL) 414, e.g., a common SL. In other words, all memory strings 408 in the same block 404 have an array common source (ACS), according to some implementations. The drain of each memory string 408 is coupled to a respective bit line 416 from which data can be read or written via an output bus (not shown), according to some implementations. In some implementations, each memory string 408 is configured to be selected or deselected by applying a select voltage or a deselect voltage to the gate of respective DSG transistor 412 through one or more DSG lines 413 and/or by applying a select voltage or a deselect voltage to the gate of respective SSG transistor 410 through one or more SSG lines 415.

As shown in FIG. 4, memory strings 408 can be organized into multiple blocks 404, each of which can have a common source line 414, e.g., coupled to the ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive bias voltage (e.g., 20 V or more).

Memory cells 406 of adjacent memory strings 408 can be coupled through word lines 418 that select which row of memory cells 406 is affected by read and program operations. Each word line 418 can include a plurality of control gates (gate electrodes) at each memory cell 406 coupled to word line 418 and a gate line coupling the control gates.

Peripheral circuits 402 can be operatively coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each select memory cell 406 through bit lines 416, word lines 418, source lines 414, SSG lines 415, and DSG lines 413. Peripheral circuits 402 can include various types of peripheral circuits formed using complementary metal-oxide-semiconductor (CMOS) technologies.

Figure 5:
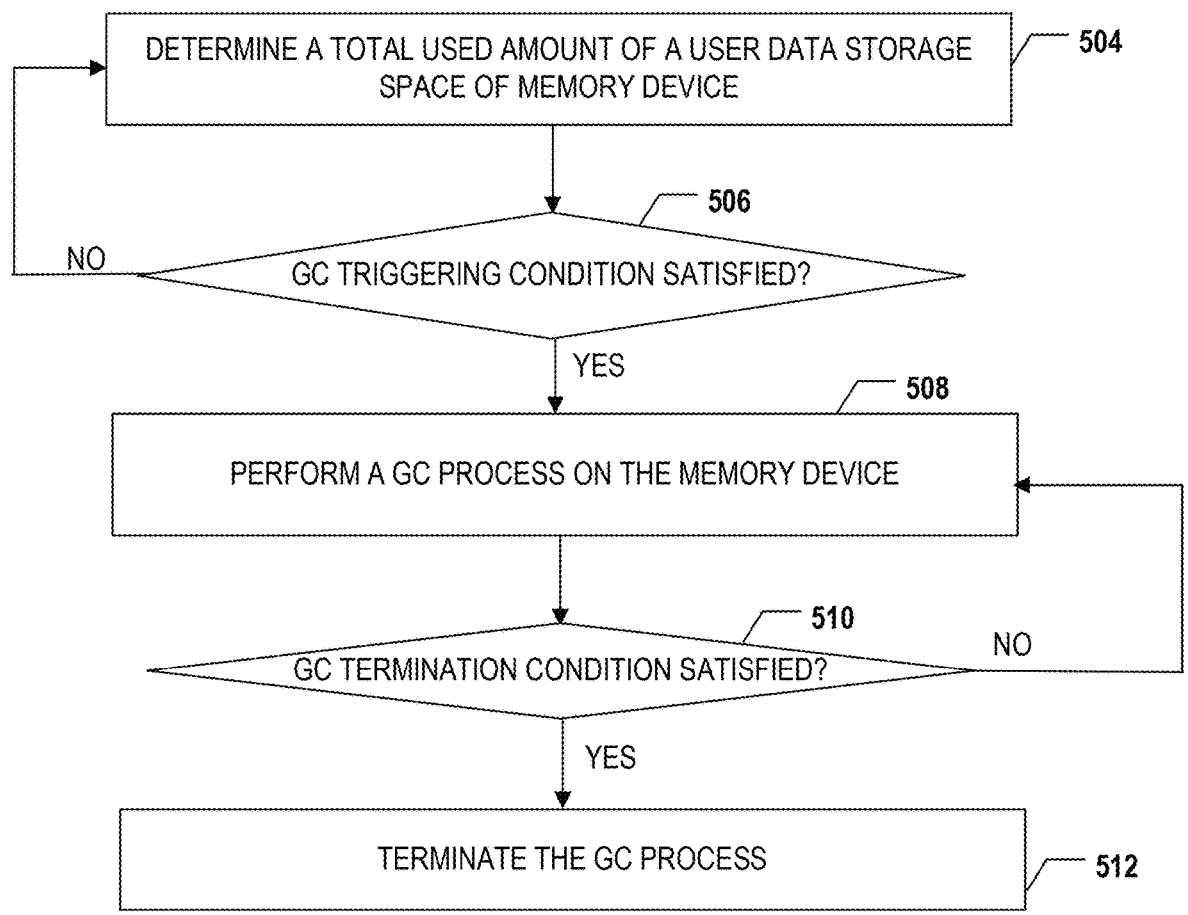
FIG. 5 illustrates a flowchart of a method for operating a memory controller, according to some aspects of the present disclosure.

FIG. 5 illustrates a flowchart of a method 500 for operating a memory controller, according to some aspects of the present disclosure. The memory controller may be any suitable memory controller disclosed herein, such as memory controller 300. The memory controller may be operatively coupled to a non-volatile memory device (e.g., memory device 302) and control the operation of memory device 302. By way of examples, FIG. 5 is described below with reference to memory controller 300 and memory device 302 without loss of generality. It is understood that the operations shown in method 500 may not be exhaustive and that other operations can be performed as well before, after, or between any of the illustrated operations. Further, some of the operations may be performed simultaneously, or in a different order than shown in FIG. 5.

Consistent with some aspects of the present disclosure, memory controller 300 may apply a GC scheme with application of a degree of logical saturation disclosed herein to determine whether to perform a GC process on memory device 302. In some implementations, the GC scheme disclosed herein can include a foreground GC process or a background GC process, which is not limited herein.

For example, the GC scheme disclosed herein includes a background GC process. It is determined whether foreground tasks of memory controller 300 are completed. For example, memory controller 300 may determine whether there are any foreground tasks to be performed. If at least part of or all of the foreground tasks are completed, memory controller 300 may proceed to perform method 500. Example foreground tasks may include, but are not limited to, bad-block management, L2P address conversion, L2P table update, error correction operations with respect to data read from or written to memory device 302, etc.

Referring to FIG. 5, method 500 starts at operation 504, in which a total used amount of a user data storage space of memory device 302 can be determined. The user data storage space of memory device 302 may be a storage space in memory device 302, which is available for the usage by a user. For example, the user data storage space can be a storage space visible to the user, a storage space that the user can use to store data, or a card size of an SSD (referred to as "cardsize"), etc. The entire storage space of memory device 302 may include the user data storage space and a redundant storage space. The redundant storage space can be a spare storage space that can be used as a backup for the user data storage space, which can be referred to as "OP."

In some implementations, each storage space (e.g., the user data storage space, the redundant storage space, etc.) can be measured using data blocks. Each data block can be a virtual block, a physical block, or any other suitable data unit, which is not limited herein. For example, the user data storage space may include a first set of data blocks (e.g., a first set of virtual blocks) that are available for the usage of a user. The redundant storage space may include a second set of data blocks (e.g., a second set of virtual blocks), which can be used as spare blocks for the first set of data blocks in the user data storage space.

In some implementations, the user data storage space may include used data blocks and unused data blocks (e.g., free blocks or empty blocks). Each used or unused data block may include a plurality of pages. For example, each used data block may include at least one of a first set of valid pages, a second set of invalid pages, and a third set of free pages. If data stored in a page is valid, then the page can be referred to as a valid page. If data stored in a page is invalid, then the page can be referred to as an invalid page. A free page can be an empty page in which no data is stored. All the pages in an unused data block are free pages (or empty pages). Examples of used data blocks and unused data blocks are illustrated below with reference to FIGS. 7A-7C.

In some implementations, memory controller 300 may determine and record a total used amount of the user data storage space of memory device 302. For example, memory controller 300 may determine and record a total number of used data blocks in the user data storage space. For each used data block, memory controller 300 may also determine and record a valid page count (VPC) for the used data block.

For example, host 108 may send data to be stored in memory device 302 to memory controller 300, causing memory controller 300 to assign one or more free pages in one or more used data blocks (or unused data blocks) of memory device 302 for the storage of the data. Memory controller 300 may send a program command, address information of the one or more free pages, and the data to memory device 302, causing memory device 302 to store the data in the one or more free pages. Then, memory controller 300 may update the total number of used data blocks in memory device 302, as well as the VPCs of the data blocks involved in the storage of the data.

In another example, host 108 may send a delete command to delete some data stored in memory device 302 to memory controller 300. Memory controller 300 may determine one or more pages in one or more used data blocks of memory device 302 where the data is stored. Memory controller 300 may update an L2P mapping table and mark the one or more pages as invalid pages. Then, memory controller 300 may update the VPCs of the one or more used data blocks involved in the storage of the data. As described below in more detail, if the one or more used data blocks involved in the storage of the data are released through the GC scheme disclosed herein, then memory controller 300 may also update the total number of used data blocks in memory device 302. For example, the one or more used data blocks can be marked as empty blocks after being released by a GC process disclosed herein.

In some implementations, the recording and update of the total number of used data blocks, as well as the recording and update of the VPC in each used data block, can be performed upon an execution of firmware (e.g., data block management firmware) of memory controller 300. In some implementations, the recording and update of the total number of used data blocks, as well as the recording and update of the VPC in each used data block, can be performed by hardware (e.g., hardware accelerator circuits such as accelerator 307). It is understood that the recording and update of the total number of used data blocks, as well as the recording and update of the VPC in each used data block, can be performed using firmware, software, hardware, or any combination thereof, which is not limited herein.

Method 500 proceeds to operation 506, as illustrated in FIG. 5, in which it is determined whether a GC triggering condition is satisfied based on the total used amount of the user data storage space. It is also determined whether to perform a GC process on memory device 302 based on whether the GC triggering condition is satisfied. For example, if it is determined that a GC triggering condition is satisfied based on the total used amount of the user data storage space, then method 500 may proceed to operation 508 to perform a GC process on memory device 302. On the other hand, if no GC triggering condition is satisfied, then method 500 may return to operation 504, and no GC process is performed on memory device 302.

In some implementations, memory controller 300 may determine a total number of expected-used data blocks in the user data storage space. Specifically, memory controller 300 may determine a degree of logical saturation for memory device 302 to be a ratio between (1) a total size of valid data in the user data storage space and (2) a size of the user data storage space. That is, the degree of logical saturation=the total size of valid data in the user data storage space/the size of the user data storage space. In some implementations, the total size of the valid data in the user data storage space may include a total number of valid pages in the user data storage space, whereas the size of the user data storage page can include a total number of pages in the user data storage space. For example, the total size of the valid data can be measured as a total size of all the valid pages in the user data storage space, such as 100 GB. The size of the user data storage space can be measured as a total size of all the pages including the valid pages, invalid pages, and empty pages in the user data storage space, such as 128 GB. Then, the degree of logical saturation is equal to 100/128× 100%=78.1%.

Then, memory controller 300 may determine the total number of the expected-used data blocks based on the degree of logical saturation. The expected-used data blocks can include data blocks that are expected to be used based on the degree of logical saturation of memory device 302. The expected-used data blocks may be the same as or different from the used data blocks. For example, the used data blocks may include virtual blocks in the user data storage space that are already used. The expected-used data blocks may include virtual blocks in the user data storage space that are expected to be used.

In a first example, memory controller 300 may determine whether the degree of logical saturation is not greater than a first saturation threshold. Responsive to the degree of logical saturation being not greater than the first saturation threshold (e.g., the degree of logical saturation≤the first saturation threshold), memory controller 300 may determine the total number of the expected-used data blocks to be a predetermined fixed value. The first saturation threshold can be predetermined or adjusted based on actual needs (e.g., the first saturation threshold can be in a range between 10% and 20%). For example, when the degree of logical saturation is smaller than or equal to the first saturation threshold, memory controller 300 may determine the total number of the expected-used data blocks as follows: the total number of the expected-used data blocks=C1×(cardsize+OP), where cardsize denotes the size of the user data storage space and OP denotes the size of the redundant storage space. C1 can be a first coefficient determined based on actual needs or actual measurements in the industry. For example, C1 can be in a range between 20% and 30%. The size of the redundant storage space "OP" can be determined based on actual storage usage of memory device 302 through execution of firmware, software, or hardware, which is not limited herein.

In a second example, memory controller 300 may determine whether the degree of logical saturation is not smaller than a second saturation threshold. Responsive to the degree of logical saturation being not smaller than the second saturation threshold (e.g., the degree of logical saturation≥the second saturation threshold), memory controller 300 may determine the total number of the expected-used data blocks to be a first saturation variable having a linear relationship with the degree of logical saturation. The second saturation threshold can be predetermined or adjusted based on actual needs (e.g., the second saturation threshold can be in a range between 80% and 95%). For example, when the degree of logical saturation is equal to or greater than the second saturation threshold, memory controller 300 may determine the total number of the expected-used data blocks as follows: the total number of the expected-used data blocks=the first saturation variable=cardsize×the degree of logical saturation×C2. C2 can be a second coefficient determined based on actual needs or actual measurements in the industry.

In a third example, memory controller 300 may determine whether the degree of logical saturation is greater than the first saturation threshold and smaller than the second saturation threshold. Responsive to the degree of logical saturation being greater than the first saturation threshold and smaller than the second saturation threshold (e.g., the first saturation threshold<the degree of logical saturation<the second saturation threshold), memory controller 300 may determine a first value of the first saturation variable when the degree of logical saturation is equal to the second saturation threshold. For example, the first value of the first saturation variable=cardsize×the second saturation threshold×C2. Memory controller 300 may also determine a second saturation variable having a nonlinear relationship with the degree of logical saturation. For example, the second saturation variable=cardsize×[C3×(the degree of logical saturation)$^2$+C4×the degree of logical saturation+C5]. C3, C4, and C5 can be a third coefficient, a fourth coefficient, and a fifth coefficient, which can be determined based on actual needs or actual measurements in the industry. Then, memory controller 300 may determine the total number of the expected-used data blocks to be a minimum of the first value of the first saturation variable and the second saturation variable. For example, the total number of the expected-used data blocks=min{cardsize×[C3×(the degree of logical saturation)$^2$+C4×the degree of logical saturation+C5], cardsize×the second saturation threshold×C2}.

In some implementations, memory controller 300 may determine whether the GC triggering condition is satisfied based on the total number of the used data blocks and the total number of the expected-used data blocks. For example, memory controller 300 may determine whether the total number of the used data blocks is greater than the total number of the expected-used data blocks. Responsive to the total number of the used data blocks being greater than the total number of the expected-used data blocks (e.g., the total number of the used data blocks>the total number of the expected-used data blocks), memory controller 300 may determine that the GC triggering condition is satisfied. Or, responsive to the total number of the used data blocks being smaller than or equal to the total number of the expected-used data blocks (e.g., the total number of the used data blocks≤the total number of the expected-used data blocks), memory controller 300 may determine that the GC triggering condition is not satisfied.

In another example, memory controller 300 may determine VPCs associated with the used data blocks in the user data storage space, respectively. Memory controller 300 may determine whether a minimum VPC from the VPCs is not greater than a VPC threshold. Responsive to the minimum VPC being not greater than the VPC threshold (e.g., the minimum VPC≤the VPC threshold), memory controller 300 may determine that the GC triggering condition is satisfied. Or, responsive to the minimum VPC being greater than the VPC threshold (e.g., the minimum VPC>the VPC threshold), memory controller 300 may determine that the GC triggering condition is not satisfied. In some implementations, the VPC threshold can be a product of a total number of pages in a data block and a sixth coefficient C6 (e.g., the VPC threshold=the total number of pages in a data block×C6). C6 can be determined based on actual needs or actual measurements in the industry. For example, C6 can be in a range between 80% and 95%.

In still another example, memory controller 300 may determine whether (1) the total number of the used data blocks is greater than the total number of the expected-used data blocks and (2) the minimum VPC from the VPCs is not greater than the VPC threshold. Responsive to (1) the total number of the used data blocks being greater than the total number of the expected-used data blocks and (2) the minimum VPC being not greater than the VPC threshold (e.g., the total number of the used data blocks>the total number of the expected-used data blocks, and the minimum VPC≤the VPC threshold), memory controller 300 may determine that the GC triggering condition is satisfied. Or, responsive to (1) the total number of the used data blocks being not greater than the total number of the expected-used data blocks or (2) the minimum VPC being greater than the VPC threshold (e.g., the total number of the used data blocks≤the total number of the expected-used data blocks, or the minimum VPC>the VPC threshold), memory controller 300 may determine that the GC triggering condition is not satisfied.

In some implementations, the total number of the used data blocks may include a total number of virtual blocks in the user data storage space that are already used. The total number of the expected-used data blocks may include a total number of virtual blocks in the user data storage space that are expected to be used.

Method 500 proceeds to operation 508, as illustrated in FIG. 5, in which the GC process can be performed on memory device 302. In some implementations, the GC process can be a background GC process. Responsive to the GC triggering condition being satisfied, memory controller 300 may perform the GC process on memory device 302. For example, memory controller 300 may determine VPCs associated with the used data blocks in the user data storage space, respectively. Memory controller 300 may select, from the used data blocks, a first data block having a minimum VPC among the VPCs. Memory controller 300 may generate and send a read command to instruct memory device 302 to read out data stored in a set of valid pages from the first data block. Memory controller 300 may receive the data stored in the set of valid pages from the first data block of memory device 302. Memory controller 300 may generate and send a program command to instruct memory device 302 to program the data previously stored in the set of valid pages of the first data block to a second data block in the user data storage space.

Further, memory controller 300 may generate and send an erase command to instruct memory device 302 to erase data stored in the first data block. Memory controller 300 may update a record of the used data blocks (e.g., identifiers of the used data blocks, the total number of the used data blocks, VPCs in the used data blocks, etc.), a record of the unused data blocks, etc. For example, the first data block can be marked as an unused data block after being erased. If the second data block is an empty data block before being programmed with the data previously stored in the set of valid pages of the first data block, then the second data block is marked as a used data block. A VPC associated with the second data block can also be updated. In some implementations, the erasing of the first data block and the update of the various records may be part of the GC process. In some other implementations, the erasing of the first data block and the update of the various records are not included in the GC process, and may be performed after the GC process completes. Examples of updating a record of the used data blocks are illustrated below with reference to FIGS. 6A-6B and FIGS. 7A-7C.

Method 500 proceeds to operation 510, as illustrated in FIG. 5, in which it is determined whether a GC termination condition is satisfied. Responsive to the GC termination condition being satisfied, the GC process may be terminated. Otherwise, method 500 returns to operation 508.

In some implementations, memory controller 300 may determine whether the total number of the used data blocks is smaller than or equal to the total number of the expected-used data blocks. Responsive to the total number of the used data blocks being smaller than or equal to the total number of the expected-used data blocks (e.g., the total number of the used data blocks≤ the total number of the expected-used data blocks), memory controller 300 may determine that the GC termination condition is satisfied. Alternatively or additionally, memory controller 300 may determine VPCs associated with the used data blocks in the user data storage space, respectively. Memory controller 300 may determine whether a minimum VPC from the VPCs is greater than the VPC threshold. Responsive to the minimum VPC being greater than the VPC threshold (e.g., the minimum VPC>the VPC threshold), memory controller 300 may determine that the GC termination condition is satisfied.

Method 500 proceeds to operation 512, as illustrated in FIG. 5, in which the GC process may be terminated.

Figure 6A:
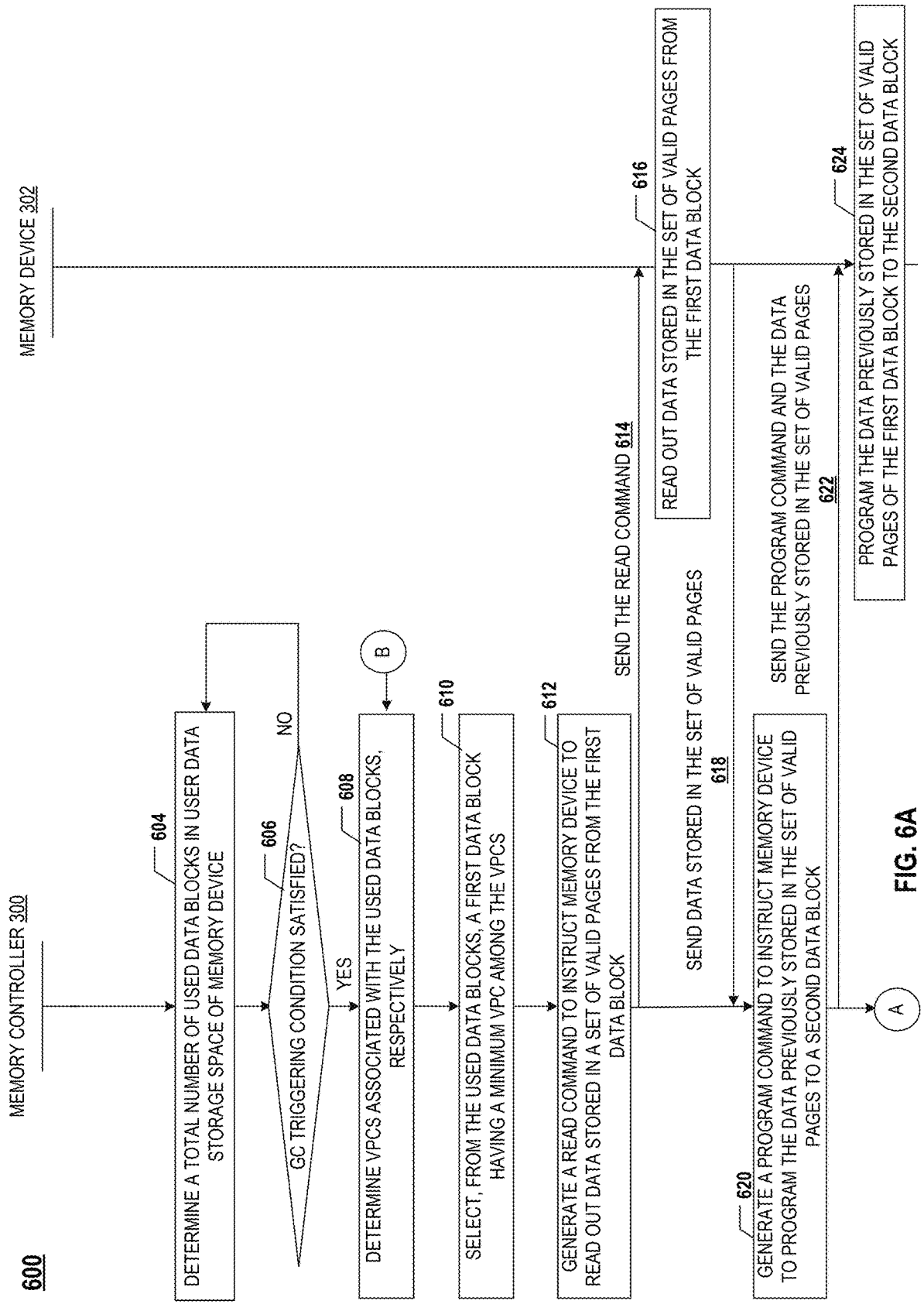
FIGS. 6A-6B illustrate an example process for operating a memory controller and a memory device, according to some aspects of the present disclosure.
Figure 6B:
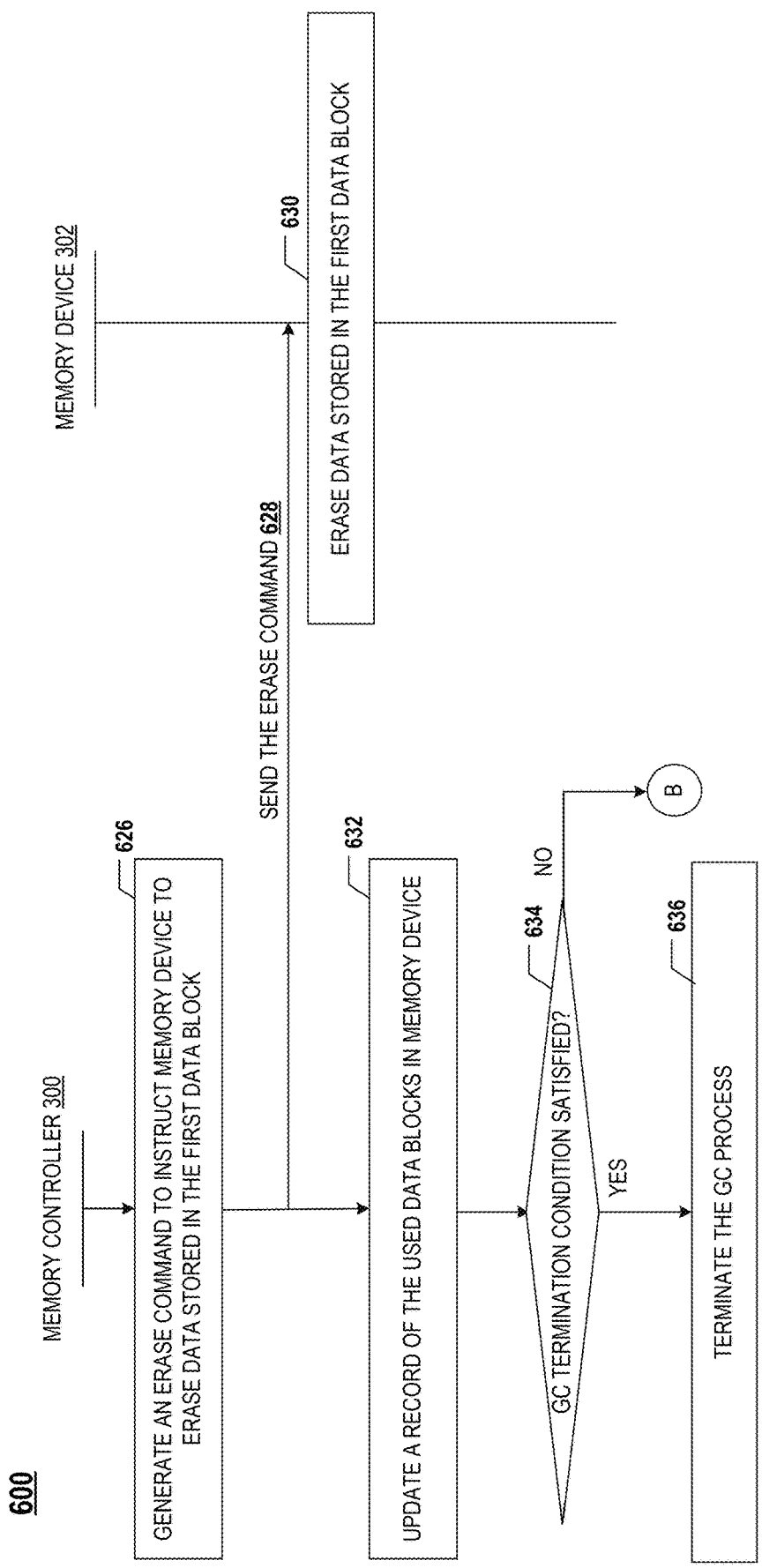

FIGS. 6A-6B illustrate an example process 600 for operating a memory controller and a memory device, according to some aspects of the present disclosure. The memory controller may be any suitable memory controller disclosed herein, such as memory controller 300. The memory controller may be operatively coupled to a non-volatile memory device (e.g., memory device 302) and control the operation of memory device 302. By way of examples, FIGS. 6A-6B are described below with reference to memory controller 300 and memory device 302 without loss of generality. It is understood that the operations shown in process 600 may not be exhaustive and that other operations can be performed as well before, after, or between any of the illustrated operations. Further, some of the operations may be performed simultaneously, or in a different order than shown in FIGS. 6A-6B.

Referring to FIG. 6A, at operation 604, memory controller 300 may determine a total number of used data blocks in a user data storage space of memory device 302.

At operation 606, memory controller 300 may determine whether a GC triggering condition is satisfied. Responsive to the GC triggering condition being satisfied, process 600 may proceed to operation 608. Otherwise, process 600 may return to operation 604.

At operation 608, memory controller 300 may determine VPCs associated with the used data blocks, respectively.

At operation 610, memory controller 300 may select, from the used data blocks, a first data block having a minimum VPC among the VPCs.

At operation 612, memory controller 300 may generate a read command to instruct memory device 302 to read out data stored in a set of valid pages from the first data block.

At operation 614, memory controller 300 may send the read command to memory device 302.

At operation 616, memory device 302 may read out data stored in the set of valid pages from the first data block.

At operation 618, memory device 302 may send the data stored in the set of valid pages of the first data block to memory controller 300.

At operation 620, memory controller 300 may generate a program command to instruct memory device 302 to program the data previously stored in the set of valid pages of the first data block to a second data block.

At operation 622, memory controller 300 may send the program command and the data previously stored in the set of valid pages of the first data block to memory device 302.

At operation 624, memory device 302 may program the data previously stored in the set of valid pages of the first data block to the second data block.

Referring to FIG. 6B, at operation 626, memory controller 300 may generate an erase command to instruct memory device 302 to erase all the data (e.g., including valid data and invalid data) stored in the first data block.

At operation 628, memory controller 300 may send the erase command to memory device 302.

At operation 630, memory device 302 may erase all the data stored in the first data block.

At operation 632, memory controller 300 may update a record of the used data blocks (e.g., the total number of the used data blocks) in memory device 302. For example, assuming that the second data block is an empty data block before programming the data previously stored in the set of valid pages of the first data block into the second data block. Memory controller 300 may update the first data block from a used data block to an empty data block. Memory controller 300 may also update the second data block from an empty data block to a used data block. Memory controller 300 may further update the VPC in the second data block. In another example, assuming that the second data block is a used data block before programming the data previously stored in the set of valid pages of the first data block into the second data block. In this case, memory controller 300 may update (1) the first data block from a used data block to an empty data block and (2) the VPC in the second data block.

At operation 634, memory controller 300 may determine whether a GC termination condition is satisfied. Responsive to the GC termination condition being satisfied, process 600 may proceed to operation 636. Otherwise, memory controller 300 may return to operation 608. At operation 636, memory controller 300 may terminate the GC process.

Figure 7A:
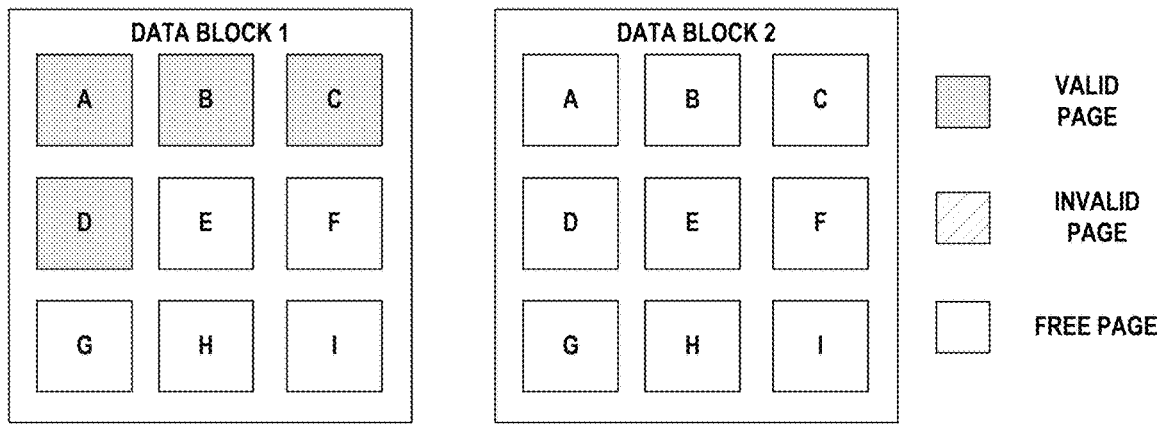
FIGS. 7A-7C illustrate an example garbage collection process, according to some aspects of the present disclosure.
Figure 7B:
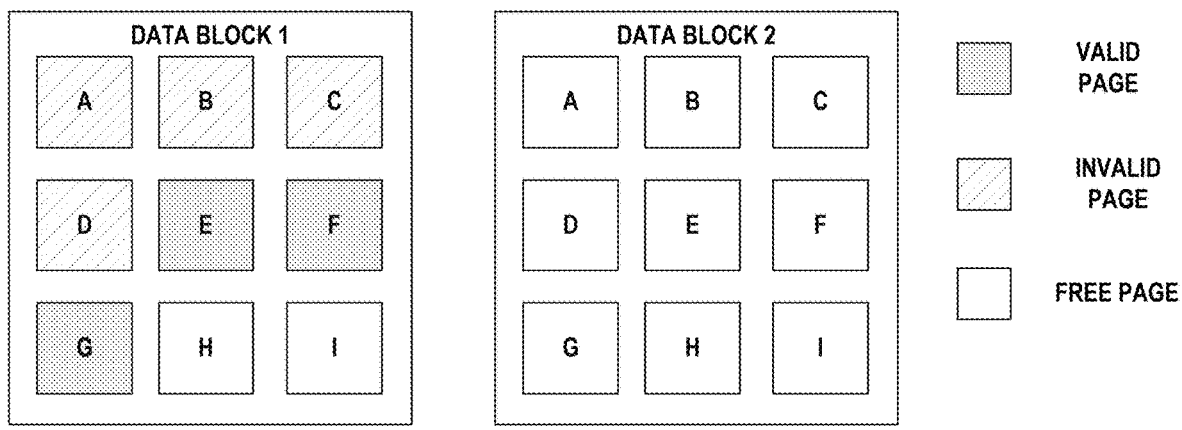
Figure 7C:
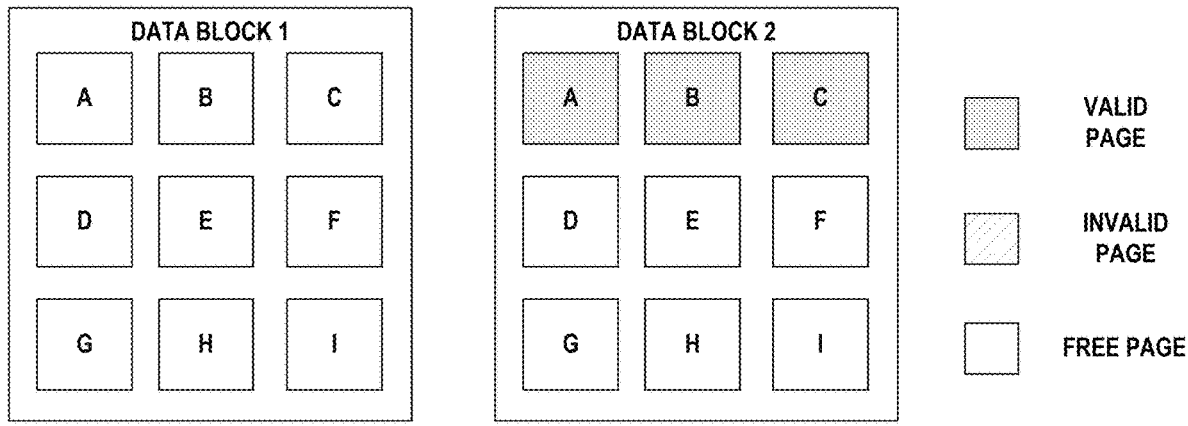

FIGS. 7A-7C illustrate an example GC process, according to some aspects of the present disclosure. In FIGS. 7A-7C, a first data block (data block 1) and a second data block (data block 2) are illustrated. Each data block includes 9 pages (from page A to page I). In FIG. 7A, there are four valid pages (A, B, C, and D) and five empty pages (E, F, G, H, and I) in the first data block, and the VPC in the first data block can be updated to be 4 valid pages in total. As shown in FIG. 7A, all the pages in the second data block are empty pages. It is contemplated that the second data block may also include one or more valid pages, which is not limited herein.

Referring to FIG. 7B, the four pages (A, B, C, and D) in the first data block are changed from valid pages to invalid pages. For example, a host (e.g., host 108) may instruct a memory controller (e.g., memory controller 300) to delete data stored in the four pages (A, B, C, and D) of the first data block. In this case, memory controller 300 may mark the four pages (A, B, C, and D) of the first data block to be invalid pages. Further, host 108 may instruct memory controller 300 to store a set of new data. Memory controller 300 may assign three empty pages (e.g., E, F, and G) in the first data block to store the set of new data. Then, the three pages E, F, and G, in which the set of new data is stored, are changed from empty pages to valid pages in the first data block. The VPC in the first data block can be updated to be 3 valid pages in total.

In FIG. 7C, a GC process is performed to release the first data block to be an empty data block. For example, data stored in the three valid pages E, F, and G of the first data block (as illustrated in FIG. 7B) is copied to three empty pages (e.g., pages A, B, and C, or any other empty pages) of the second data block. Then, all the data stored in the first data block (e.g., data stored in pages A-G of the first data block) can be erased. The first data block can be changed from a used data block shown in FIGS. 7A-7B to an empty data block shown in FIG. 7C. For example, if the second data block is an empty data block before the copying of the data stored in the valid pages of the first data block, the second data block is changed from the empty data block to a used data block. The VPC in the second data block can be updated to be 3 valid pages in total.

Figure 8:
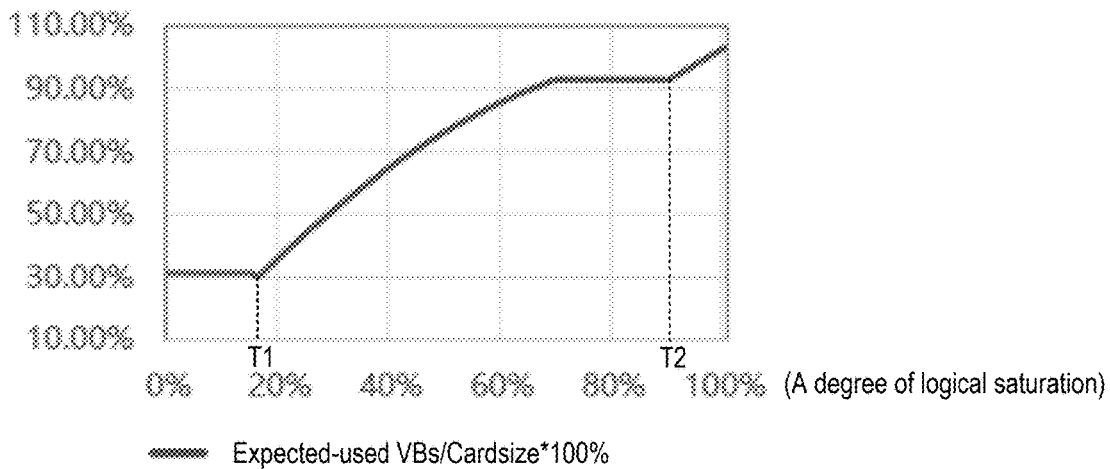
FIGS. 8-9 illustrate example simulation results of a GC scheme disclosed herein with application of a degree of logical saturation, according to some aspects of the present disclosure.
Figure 9:
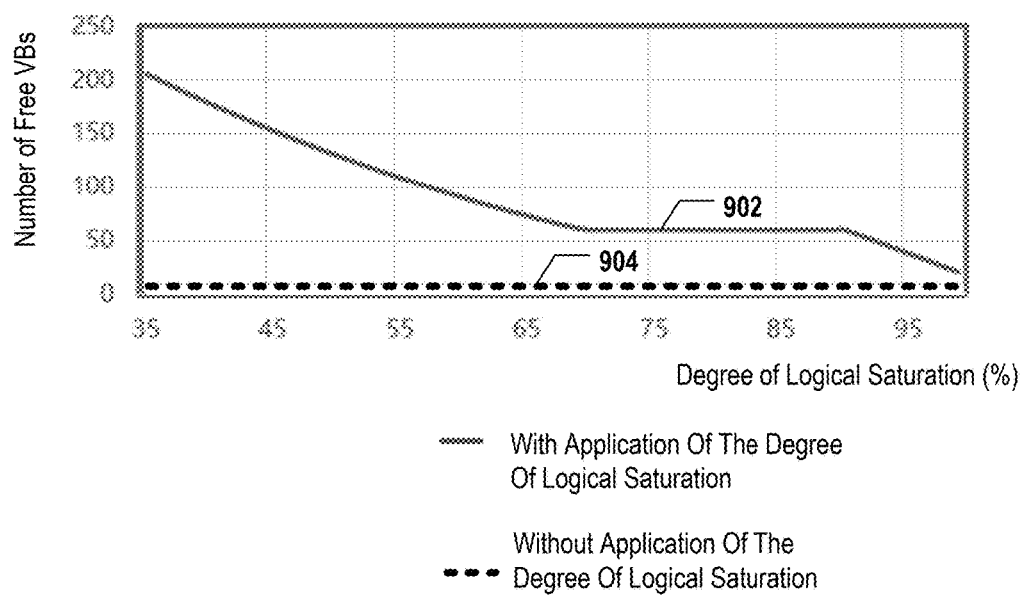

FIGS. 8-9 illustrate example simulation results of a GC scheme disclosed herein with application of a degree of logical saturation, according to some aspects of the present disclosure. In FIG. 8, the x axis represents the degree of logical saturation. FIG. 8 depicts a curve that represents a ratio between the total number of the expected-used virtual blocks and the size of the user data storage space as a function of the degree of logical saturation. T1 and T2 may represent the first saturation threshold and the second saturation threshold, respectively.

FIG. 9 illustrates example performance of the GC scheme disclosed herein with application of the degree of logical saturation. The performance is simulated in a dirty disk scenario with severe file fragmentation in a memory device. In each used virtual block of the memory device, a ratio between its VPC and the total number of pages in the virtual block is equal to the degree of logical saturation. In FIG. 9, the x axis represents the degree of logical saturation, and the y axis represents a number of free virtual blocks after performing a GC process. A first curve 902 may indicate a change in the number of free virtual blocks as a function of the degree of logical saturation when the GC scheme disclosed herein is applied. A second curve 904 may indicate a change in the number of free virtual blocks when another GC scheme (without the application of the degree of logical saturation) is applied. Comparing first curve 902 and second curve 904, it can be seen that the GC scheme disclosed herein can effectively increase the number of free virtual blocks in the dirty disk scenario, leading to an enhancement in the write performance of the memory device. The GC scheme disclosed herein can pass an aging test such that even when the degree of logical saturation is greater than 95%, the performance drop of the memory device can be less than 20%.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 300 in FIG. 3A. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, include CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be com-

What is claimed is:

1. A method for operating a memory controller, comprising:
   determining a total number of used data blocks in a user data storage space of a memory device;
   determining a total number of expected-used data blocks in the user data storage space;
   determining whether a garbage collection (GC) triggering condition is satisfied at least based on whether the total number of used data blocks is greater than the total number of expected-used data blocks; and
   determining whether to perform a GC process on the memory device based on whether the GC triggering condition is satisfied.

2. The method of claim 1, wherein:
   the total number of the used data blocks comprises a total number of virtual blocks in the user data storage space that are already used; and
   the total number of the expected-used data blocks comprises a total number of virtual blocks in the user data storage space that are expected to be used.

3. The method of claim 1, further comprising:
   responsive to the total number of the used data blocks being greater than the total number of the expected-used data blocks, determining that the GC triggering condition is satisfied; or
   responsive to the total number of the used data blocks being smaller than or equal to the total number of the expected-used data blocks, determining that the GC triggering condition is not satisfied.

4. The method of claim 1, wherein determining whether the GC triggering condition is satisfied further comprises:
   determining valid page counts (VPCs) associated with the used data blocks in the user data storage space, respectively; and
   determining whether a minimum VPC from the VPCs is not greater than a VPC threshold.

5. The method of claim 4, further comprising:
   responsive to the total number of the used data blocks being greater than the total number of the expected-used data blocks and the minimum VPC being not greater than the VPC threshold, determining that the GC triggering condition is satisfied; or
   responsive to the total number of the used data blocks being not greater than the total number of the expected-used data blocks or the minimum VPC being greater than the VPC threshold, determining that the GC triggering condition is not satisfied.

6. The method of claim 1, wherein determining the total number of the expected-used data blocks comprises:
   determining a degree of logical saturation for the memory device to be a ratio between a total size of valid data in the user data storage space and a size of the user data storage space; and
   determining the total number of the expected-used data blocks based on the degree of logical saturation.

7. The method of claim 6, wherein the total size of the valid data in the user data storage space comprises a total number of valid pages in the user data storage space.

8. The method of claim 6, wherein determining the total number of the expected-used data blocks based on the degree of logical saturation comprises:
   responsive to the degree of logical saturation being not greater than a first saturation threshold, determining the total number of the expected-used data blocks to be a predetermined fixed value.

9. The method of claim 8, wherein determining the total number of the expected-used data blocks based on the degree of logical saturation further comprises:
   responsive to the degree of logical saturation being not smaller than a second saturation threshold, determining the total number of the expected-used data blocks to be a first saturation variable having a linear relationship with the degree of logical saturation.

10. The method of claim 9, wherein determining the total number of the expected-used data blocks based on the degree of logical saturation further comprises:
    responsive to the degree of logical saturation being greater than the first saturation threshold and being smaller than the second saturation threshold,
    determining a first value of the first saturation variable when the degree of logical saturation is equal to the second saturation threshold;
    determining a second saturation variable having a non-linear relationship with the degree of logical saturation; and
    determining the total number of the expected-used data blocks to be a minimum of the first value of the first saturation variable and the second saturation variable.

11. The method of claim 1, wherein the GC process is a background GC process, and determining whether to perform the GC process on the memory device comprises:
    responsive to the GC triggering condition being satisfied, performing the GC process on the memory device by:
    determining valid page counts (VPCs) associated with the used data blocks in the user data storage space, respectively;
    selecting, from the used data blocks, a first data block having a minimum VPC among the VPCs;
    generating and sending a read command to instruct the memory device to read out data stored in a set of valid pages from the first data block;
    receiving the data stored in the set of valid pages from the first data block of the memory device; and
    generating and sending a program command to instruct the memory device to program the data stored in the set of valid pages to a second data block in the user data storage space.

12. The method of claim 11, further comprising:
    generating and sending an erase command to instruct the memory device to erase data stored in the first data block; and
    updating the total number of the used data blocks.

13. The method of claim 11, further comprising:
    determining whether a GC termination condition is satisfied; and
    responsive to the GC termination condition being satisfied, terminating the GC process.

14. The method of claim 13, wherein determining whether the GC termination condition is satisfied comprises:
    determining whether the total number of the used data blocks is smaller than or equal to the total number of the expected-used data blocks; and
    responsive to the total number of the used data blocks being smaller than or equal to the total number of the expected-used data blocks, determining that the GC termination condition is satisfied.

15. The method of claim 13, wherein determining whether the GC termination condition is satisfied comprises:
  determining valid page counts (VPCs) associated with the used data blocks in the user data storage space, respectively;
  determining whether a minimum VPC from the VPCs is greater than a VPC threshold; and
  responsive to the minimum VPC being greater than the VPC threshold, determining that the GC termination condition is satisfied.

16. A memory controller, comprising:
  a memory configured to store instructions; and
  a processor coupled to the memory and configured to execute the instructions to perform a process comprising:
    determining a total number of used data blocks in a user data storage space of a memory device;
    determining a total number of expected-used data blocks in the user data storage space;
    determining whether a garbage collection (GC) triggering condition is satisfied at least based on whether the total number of used data blocks is greater than the total number of expected-used data blocks; and
    determining whether to perform a GC process on the memory device based on whether the GC triggering condition is satisfied.

17. A memory system, comprising:
  a memory device; and
  a memory controller operatively coupled to the memory device and configured to:
    determine a total number of used data blocks in a user data storage space of the memory device;
    determine a total number of expected-used data blocks in the user data storage space;
    determine whether a garbage collection (GC) triggering condition is satisfied at least based on whether the total number of used data blocks is greater than the total number of expected-used data blocks; and
    determine whether to perform a GC process on the memory device based on whether the GC triggering condition is satisfied.

18. The memory controller of claim 16, wherein the process further comprises:
  responsive to the total number of the used data blocks being greater than the total number of the expected-used data blocks, determining that the GC triggering condition is satisfied; or
  responsive to the total number of the used data blocks being smaller than or equal to the total number of the expected-used data blocks, determining that the GC triggering condition is not satisfied.

19. The memory controller of claim 16, wherein determining whether the GC triggering condition is satisfied further comprises:
  determining valid page counts (VPCs) associated with the used data blocks in the user data storage space, respectively; and
  determining whether a minimum VPC from the VPCs is not greater than a VPC threshold.

20. The memory controller of claim 19, wherein the process further comprises:
  responsive to the total number of the used data blocks being greater than the total number of the expected-used data blocks and the minimum VPC being not greater than the VPC threshold, determining that the GC triggering condition is satisfied; or
  responsive to the total number of the used data blocks being not greater than the total number of the expected-used data blocks or the minimum VPC being greater than the VPC threshold, determining that the GC triggering condition is not satisfied.

* * * * *